(12) United States Patent
Fitzi

(10) Patent No.: US 8,013,660 B2
(45) Date of Patent: Sep. 6, 2011

(54) SYSTEM AND METHOD FOR CHARGE INTEGRATION

(75) Inventor: Andreas Fitzi, Stäfa (CH)

(73) Assignee: austriamicrosystems AG, Unterpremstätten (AT)

( * ) Notice: Subject to any disclaimer, the term of this patent is extended or adjusted under 35 U.S.C. 154(b) by 0 days.

(21) Appl. No.: 12/518,622

(22) PCT Filed: Nov. 28, 2007

(86) PCT No.: PCT/EP2007/062955
§ 371 (c)(1),
(2), (4) Date: Dec. 8, 2009

(87) PCT Pub. No.: WO2008/071549
PCT Pub. Date: Jun. 19, 2008

(65) Prior Publication Data
US 2010/0164594 A1    Jul. 1, 2010

(30) Foreign Application Priority Data
Dec. 11, 2006  (DE) .................. 10 2006 058 292

(51) Int. Cl.
*H01L 27/146* (2006.01)
(52) U.S. Cl. .... 327/514; 327/337; 327/554; 250/370.09

(58) Field of Classification Search .......... 327/509–517, 327/336–337, 554, 558; 250/370.09
See application file for complete search history.

(56) References Cited

U.S. PATENT DOCUMENTS

| | | | | |
|---|---|---|---|---|
| 5,488,415 | A | * | 1/1996 | Uno .............................. 348/241 |
| 6,265,737 | B1 | | 7/2001 | Ducourant |
| 7,391,004 | B2 | * | 6/2008 | Takashima et al. ........ 250/208.1 |
| 7,791,032 | B2 | * | 9/2010 | Karim ...................... 250/370.09 |

FOREIGN PATENT DOCUMENTS
EP    1 011 193    6/2000

OTHER PUBLICATIONS
U. Tietze, et al., "Halbleiter-Schaltungstechnik", 3rd Edition, Springer, pp. 139-141, 1974.

* cited by examiner

*Primary Examiner* — Dinh T. Le
(74) *Attorney, Agent, or Firm* — Cozen O'Connor

(57) ABSTRACT

An arrangement for charge integration comprises a charge-generating circuit (2) that provides a charge-dependent signal, and a coupling circuit (20) comprising a first and a second transistor (T1, T2). The first transistor (T1) can be controlled in dependence on the charge-dependent signal. The second transistor (T2) is configured to forward the charge-dependent signal in dependence on a control signal provided by the first transistor (T1). The forwarded charge-dependent signal is integrated by an integrator (30).

11 Claims, 4 Drawing Sheets

SYSTEM AND METHOD FOR CHARGE INTEGRATION

CROSS REFERENCE TO RELATED APPLICATIONS

This application is a U.S. national stage under 35 USC §371 of application No. PCT/EP2007/062955, filed on Nov. 28, 2007.

This application claims the priority of German Patent Application No. 10 2006 058 292.6 filed Dec. 11, 2006 the entire content of which is hereby incorporated by reference.

FIELD OF THE INVENTION

The invention concerns an arrangement and a method for charge integration and an application of the arrangement.

BACKGROUND OF THE INVENTION

Many sensors in technical applications generate charges that are output as sensor signals. Relatively small currents, for instance, can occur. For this reason it is usual for the charges to be integrated and converted into voltages. The photodiodes used in the sensor field of a digital X-ray machine are an example of this type of sensor.

In order to achieve adequate image quality in digital X-ray images, it is desirable for a circuit used for charge integration to exhibit a linear integration function along with low noise. In addition, a circuit of this type should be appropriate for the desired image or frame rates, and should consume low current, in order to avoid a rise in temperature and the associated effects this might have on temperature-dependent components.

Capacitive elements having low capacitances are frequently used for integration in order to reach higher voltages. Switches are also used to control the integration procedure. These often exhibit voltage-dependent parasitic capacitances, arising for instance from the depletion layer capacitance present when semiconductor switches are used. The parasitic capacitances can affect the accuracy of the integration. In addition, the sensor that generates the charge can also exhibit parasitic capacitances, again possibly arising because of the switches used, or in the form of conductor capacitances that can falsify the result of the integration result, depending on the noise in the circuit.

An attempt is made in conventional integration circuits, for instance, to compensate for the parasitic capacitances through elements with an opposing capacitative behaviour. Since, however, elements with entirely complementary capacitative behaviour are not generally available, residual non-linearities are still found. It is also difficult to compensate for any non-linearities that occur using subsequent digital processing, as the parasitic capacitances involved in each case vary as a consequence of process variations.

SUMMARY OF THE INVENTION

An object of the invention is to provide an arrangement and a method of charge integration with which charge integration can be carried out with improved linearity and with low current consumption. It is also an object of the invention to provide a method for the use of the arrangement.

In one embodiment of the invention, an arrangement for charge integration comprises a charge generation circuit that outputs a charge-dependent signal. A coupling circuit is furthermore provided between a first and a second transistor. The first transistor can here be controlled in accordance with the charge-dependent signal. The second transistor is arranged in such a way as to transmit the charge-dependent signal onwards, depending on a control signal that is generated by the first transistor. An integrator performs integration of the transmitted charge-dependent signal.

By coupling the integrator, which usually comprises parasitic capacitances, to the charge-generating circuit through the coupling circuit, the effect of the parasitic capacitances on the result of the integration carried out by the integrator is reduced. Any noise that occurs therefore has a reduced effect on non-linearities in the integration.

In a further embodiment of the invention, the integrator comprises a differential amplifier in which the feedback circuit comprises a capacitative charge store. The capacitative charge store can here be discharged in response to a control signal. The capacitative charge store may, for instance, be implemented in the form of a capacitor.

Accordingly, a charge or a charge-dependent signal output by the charge-generating circuit can be integrated in the capacitative charge store to develop a voltage that depends on the quantity of charge generated. Discharge can, for instance, be provided through a switch connected parallel to the capacitative charge store.

In a further embodiment of the invention, the charge-dependent signal can be supplied to the integrator through a switching arrangement that can be operated in accordance with a further control signal. In this way, the charge-generating circuit or the coupling circuit can be connected to the integrator or be separated from the integrator, in order to exercise control over the integration process.

The charge-generating circuit can, for instance, take the form of a sensor element in a digital X-ray machine. The charge-generating circuit may therefore comprise at least one photodiode.

The first and second transistors of the coupling circuit can be implemented as field-effect transistors, for instance as junction field-effect transistors (JFET) or as insulated-gate field-effect transistors (IGFET). In various embodiments, the transistors may be constructed as metal oxide-semiconductor field-effect transistors (MOSFET).

In one embodiment of a method according to the invention for charge integration, a charge-dependent signal is generated. A control signal is, further, generated depending on the charge-dependent signal. The charge-dependent signal is transmitted onwards in dependence on the control signal, and integrated to create an output signal.

In one embodiment of the method a capacitative charge store can be discharged in dependence on a further control signal during a first period of time, while in a second period of time the charge-dependent signal is transmitted onwards in dependence on the further control signal. In this way, defined boundary conditions for the integration of the charge-dependent signal are achieved.

BRIEF DESCRIPTION OF THE DRAWINGS

Several embodiments of the invention are explained in more detail below with the aid of the figures. Elements with the same function or same effect are here given same reference signs.

In the figures.

DETAILED DESCRIPTION OF THE DRAWINGS

Figure 1:
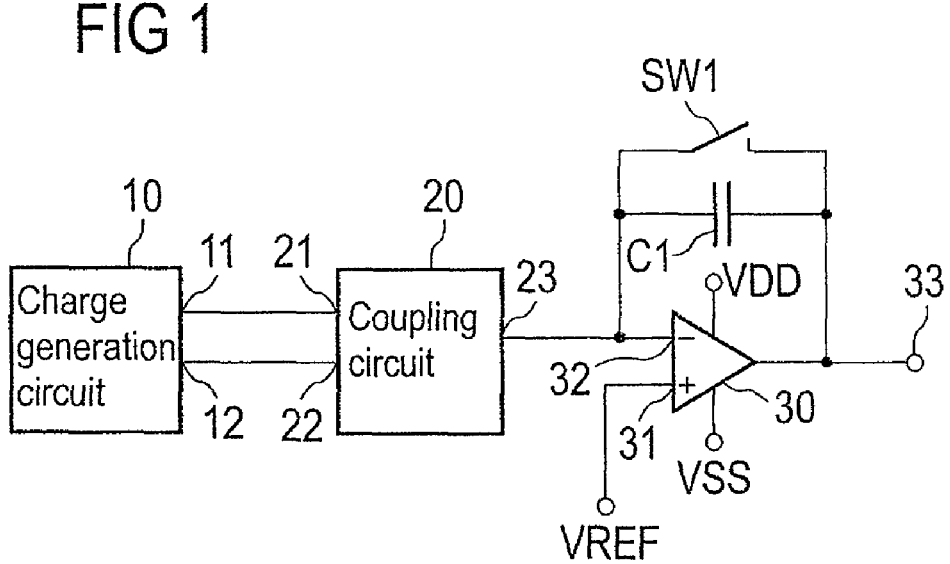
FIG. 1 shows a first embodiment of an arrangement for charge integration.

FIG. 1 shows an embodiment of an arrangement for charge integration comprising a charge generation circuit 10, a coupling circuit 20, and a differential amplifier 30. The charge generation circuit 10 comprises a first and a second signal connection 11, 12, coupled to a first and a second input 21, 22 of the coupling circuit 20. The differential amplifier 30, whose power is supplied through a power supply connection VDD and a source potential connection VSS, has a first, non-inverting input 31 that is coupled to a reference potential connection VREF. A second, inverting input 32 to the differential amplifier 30 is connected to an output 23 of the coupling circuit 20. In addition, an output 33 of the differential amplifier 30 is connected to the inverting input via a capacitative charge store C1 and a switch SW1 connected in parallel with it. The capacitative charge store C1 may, for instance, be implemented in the form of a capacitor. A voltage at the reference potential connection VREF can be provided, for example, by a ground potential.

When the arrangement is operating, the charge generating circuit 10 creates charge carriers, and supplies them in the form of a charge-dependent signal to the coupling circuit 20.

When suitable charges arise, transistors, not shown here, in the coupling circuit 20 are driven in such a way that the charge-dependent signal is ultimately transmitted to the differential amplifier 30, which is connected in the configuration of an integrator. During an integration in a first period of time, here, the switch SW1 is in an open, non-conducting state. Due to the charge-dependent signal, the potential at input 32 of the integrator 30 is modified, as a result of which the charge store C1 is charged up to a voltage that depends on the quantity of charge carriers created. A corresponding voltage can then be taken for further processing from the output 33 of the integrator 30.

By closing the switch SW1, the potential at the charge store C1 is equalized during a second period of time, as a result of which it is returned to a defined initial state prior to a subsequent integration procedure.

Figure 2:
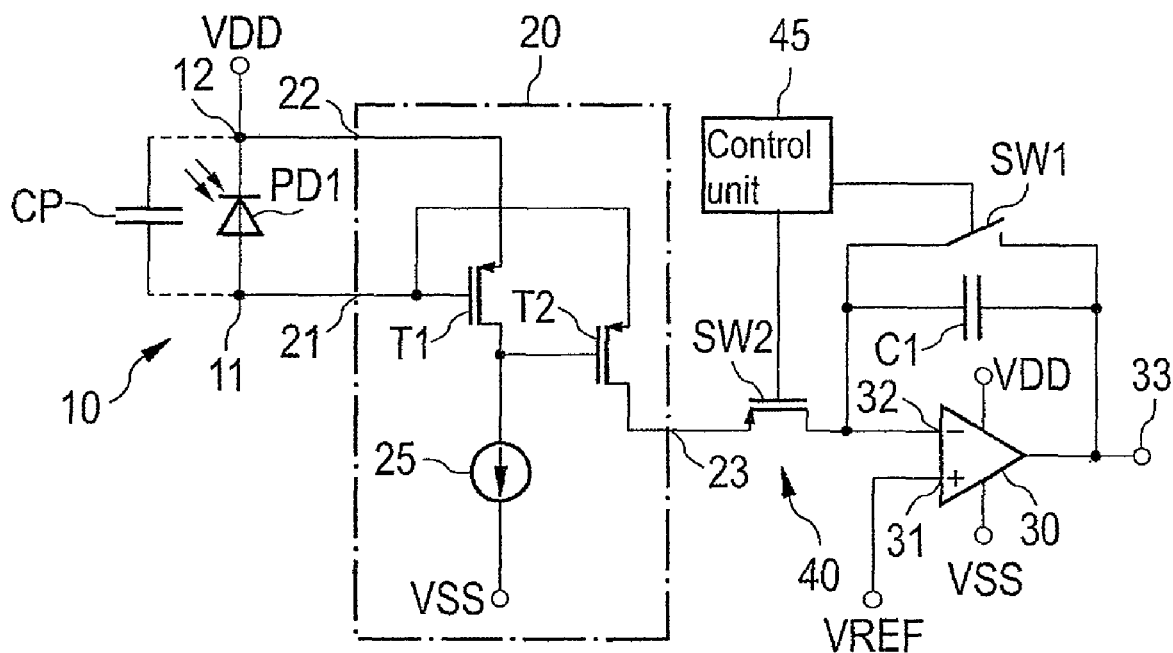
FIG. 2 shows a second embodiment of an arrangement for charge integration.

FIG. 2 shows a further embodiment of an arrangement for charge integration. Here the charge generating circuit 10 comprises a photodiode PD1 and the capacitative element CP. The capacitative element CP is not implemented here by means of a specific component, but symbolically represents the parasitic capacitances present in the charge generation circuit 10. The capacitative element CP consists, for instance, of conductor capacitances, or, in addition, the capacitances of switches, not shown here, through which the photodiode PD1 is joined to connections 11, 12.

The cathode of the photodiode PD1 is connected here to the power supply connection VDD. The nature of the photodiode PD1 means that when illuminated it passes the current its reverse-bias direction, which in this implementation means from connection 11 to connection 21.

The coupling circuit 20 comprises a first transistor T1 and a second transistor T2, implemented as p-channel field-effect transistors, for instance as p-channel MOSFETs. The first transistor T1 has a control or gate connection that is connected to the first input 21 of the coupling circuit 20. A first or drain connection of the first transistor T1 is connected to a current source 25 which, furthermore, is coupled to a source potential connection VSS. A second, source connection to the first transistor T1 is coupled to the second input 22.

A control or gate connection to the second transistor T2 is coupled to the drain connection of the first transistor T1. In addition, a first or drain connection to the second transistor is coupled to the output 23 of the coupling circuit, while a second or source connection to the second transistor T2 is coupled to input 21 of the coupling circuit 20.

The arrangement for charge integration further comprises a switching unit 40 that couples the output 23 from the coupling circuit 20 to the second input 32 of the differential amplifier 30. The switching unit 40 is here formed by a second switch SW2, implemented in the form of a transistor switch. The second switch SW2 is, for instance, implemented as a p-channel field-effect transistor. Furthermore, a control circuit 45 is included and used to control the first and second switches SW1 and SW2.

When, as a result of being illuminated, photodiode PD1 passes a current to connection 11, the potential at the gate connection of the first transistor T1 rises, as a result of which it changes from a conducting state into a high-impedance state. In consequence, the potential at the drain connection of the first transistor, or of the gate connection to the second transistor, in turn drops, causing the controlled channel in the second transistor T2 to enter a conductive state. As a result, current can flow from output 11 of the charge generation circuit 10 to output 23 of the coupling circuit 20.

For the purposes of integration, the first switch SW1 is closed during a first period of time, while the second switch SW2 is open to discharge the capacitative charge store C1, while at the same time a flow of charge carriers, that is current from the coupling circuit 20, is prevented during the discharging procedure.

During a second period of time, the first switch SW1 is opened while the second switch SW2 is closed, i.e. is in a conductive state. This means that the charge-dependent signal that is generated by photodiode PD1 is passed through the coupling circuit 20 and the second switch SW2 onto the integrator 30 which, as shown in FIG. 1, leads to the charge store C1 becoming charged up.

When the voltage at connection 21 of the coupling circuit 20 falls, the first transistor T1 again enters a conductive state, causing the voltage at the gate connection of the second transistor T2 to rise, placing this in a high-impedance state. As a result, the flow of current between the charge generating circuit 10 and the integrator 30 is prevented.

If it were not for the separation and coupling of the charge generating circuit 10 from and to the integrator 30 provided by coupling circuit 20, noise in the circuit could cause charges to be generated in the parasitic capacitance CP. During an integration, the charges generated in that way would be detected and processed in the same way as charges that are generated by the photodiode PD1, thereby falsifying the result of the integration. This means that using a coupling circuit 20 gives the arrangement an improved noise performance.

Figure 3:
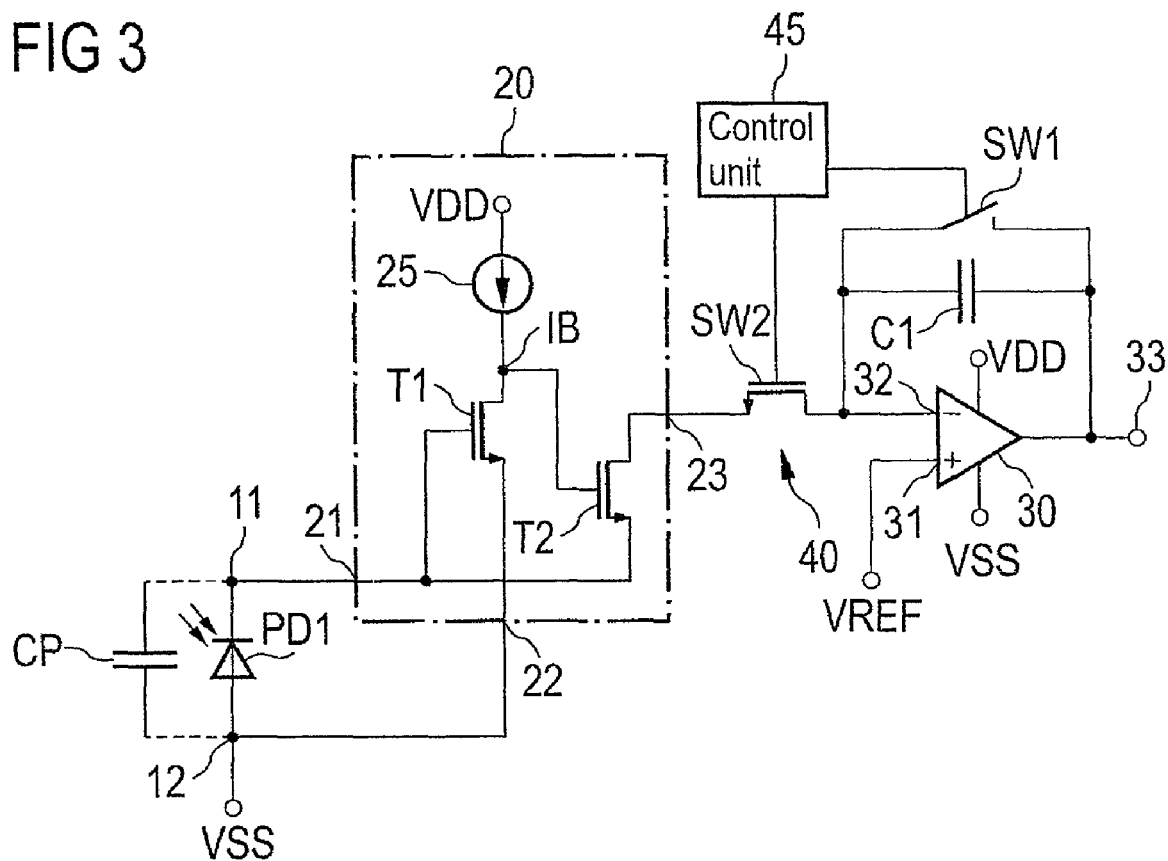
FIG. 3 shows a third embodiment of an arrangement for charge integration.

FIG. 3 illustrates a further embodiment of an arrangement for charge integration. The anode of the photodiode PD1 is connected here to the source potential VSS. In contrast to the previous embodiment, a current arising as a result of illumination in the photodiode PD1 flows from connection 21 of the coupling circuit 20 to the first connection 11 of the charge generating circuit 10. The switch SW2 is implemented in this example as an n-channel field-effect transistor.

The coupling circuit 20 comprises a first and a second n-channel field-effect transistor T1, T2. A gate connection of the first transistor T1 and a source connection of the second transistor T2 are here connected to the first input 21. A first connection or drain connection of the first transistor T1 is connected to a current output IB of the current source 25 which, in this embodiment, is coupled to the power supply connection VDD. The current source 25 again sets a working point for the first transistor T1. A second or source connection of the first transistor T1 is connected to the second input 22.

The control or gate connection of the second transistor T2 is coupled to the first connection of the first transistor T1. The controlled channel of the second transistor T2 couples the first input 21 to the output 23 of the coupling circuit 20. In this way a control signal can be generated with the first transistor T1 through a charge-dependent signal generated by the charge generating circuit 10, and this signal can drive the second transistor T2 to couple the charge-generating circuit 10 to the integrator 30.

For instance, if a potential at the gate connection of the first transistor T1 drops in the presence of the current through the photodiode PD1, it will enter a high-impedance state. This, in turn, results in an increased potential at the control connection of the second transistor T2, opening its controlled channel. The charge-dependent signal can therefore be passed through the second transistor T2 to the integrator 30.

An integration procedure can, as described in the previous embodiment, be controlled by appropriately setting the first and second switches SW1 and SW2.

In summary, positive charges can be integrated using the embodiment shown in FIG. 2, while negative charges can be integrated by the implementation of FIG. 3.

Figure 4:
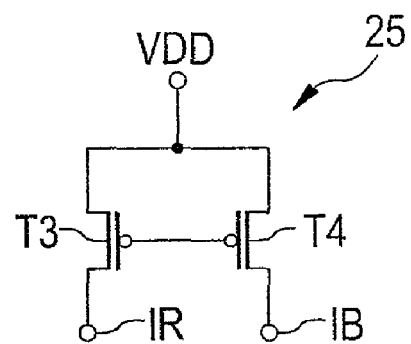
FIG. 4 shows an embodiment of a transistor current source.

FIG. 4 illustrates an embodiment of a current source 25 which can, for instance, be applied in the embodiment of the arrangement according to FIG. 3. Here, the current source comprises a first and a second transistor T3, T4, connected as a current mirror. A reference current, supplied through current output IB from the current mirror transistor T4, can, for instance, be supplied through a reference current input IR.

The current source 25 can set a working point for the first transistor T1 in the coupling circuit 20. In this case, a working current at the working point also determines the noise of transistor T1. The noise in the coupling circuit 20, for instance, drops with an increased working current, although this is associated with an increase in current consumption. Through an appropriate selection of the working current, it is possible to achieve low noise at the same time as low current consumption.

Both field-effect transistors with insulated-gates and junction field-effect transistors can be used as the transistors in the embodiments illustrated. It is also, however, possible to apply bipolar transistors. The switches SW1 and SW2 can also be implemented using other switching elements.

Figure 5A:
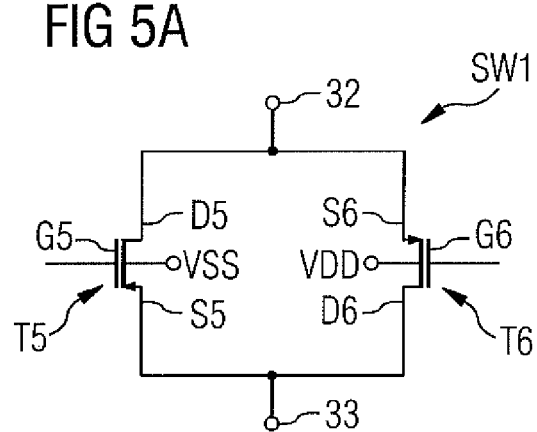
FIG. 5A shows an embodiment of a transistor switch.

FIG. 5A shows an embodiment of a switch SW1 implemented as a transistor switch. The switch SW1 here comprises a first and a second transistor T5, T6, where transistor T5 is implemented, for instance, as an n-channel field-effect transistor while transistor T6 is implemented as a p-channel field-effect transistor. The drain connection D5 of transistor T5 and the source connection S6 of transistor T6 are connected together in switch SW1, and are connected to the input 32 of the integrator 30.

Similarly, the source connection S5 of the transistor T5 and the drain connection D6 of the transistor T6 are connected to one another and to the output 32 of the integrator 30. A substrate connection to transistor T5 is coupled to the source potential connection VSS. Correspondingly, the substrate connection of transistor T6 is coupled to the power supply connection VDD. A control signal can be supplied to the gate connections G5, G6 of transistors T5, T6, for operating the switch SW1. The control signal normally consists of control voltages by means of which the two transistors T5, T6 can be driven hard on or hard off.

Figure 5B:
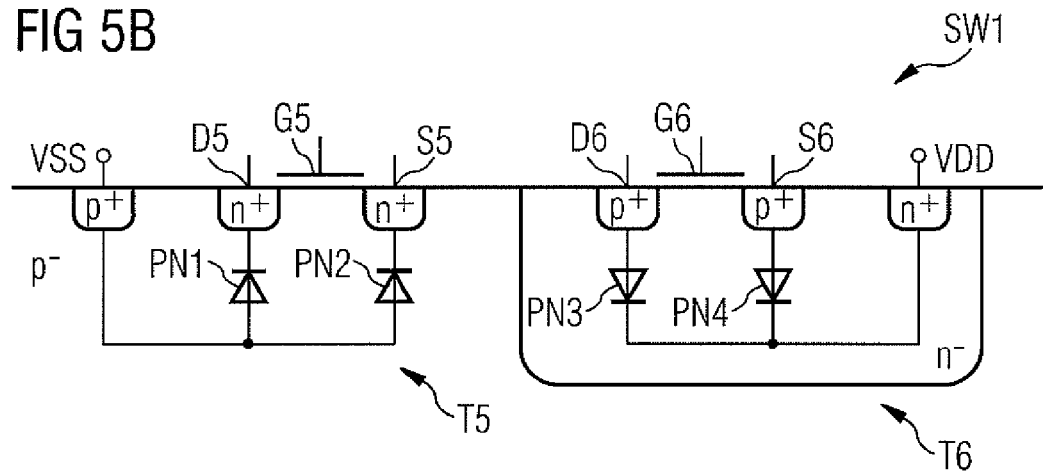
FIG. 5B shows an example of an equivalent circuit for the transistor switch of FIG. 5A.

FIG. 5B shows an example of an equivalent circuit for the transistor switch SW1 illustrated in FIG. 5A. The regions marked with p+, n+, p− and n− represent regions with corresponding p or n doping, as are found in an integrated semiconductor circuit. As a result, pn transition regions PN1 and PN2, each of which is associated with a depletion layer capacitance, are formed between the drain or source connections D5, S5 and the substrate connection of transistor T5 that is coupled to the source potential connection VSS.

Similarly, pn transition regions PN3 and PN4 are formed between the drain or source connections D6, S6 and the substrate connection of transistor T6. The values of the depletion layer capacitances at the pn transition regions PN1 to PN4 depend on the voltage between the substrate connections and the source or drain connections of the transistors T5, T6. Variations or changes in the voltage, and the changes in capacitance resulting from that at the pn transition regions PN1, PN4 are reduced through the use of the differential amplifier 30, as a result of which they only have a small influence on the precision of the integrated output signal at output 33. The pn transition regions PN2, PN3, which are connected to output 33 of the differential amplifier 30 have their potential set by it directly, as a result of which their influence is negligible.

Figure 6:
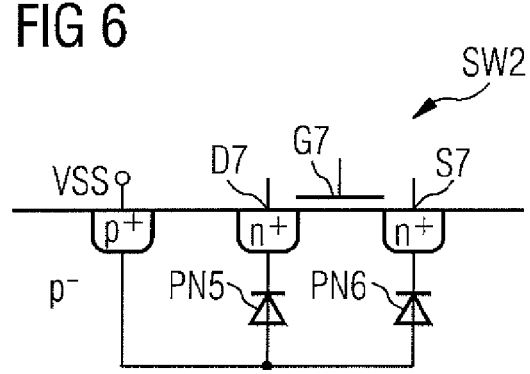
FIG. 6 shows an example of an equivalent circuit for a further transistor switch and FIG. 7 shows an embodiment of a charge-generating circuit.

FIG. 6 illustrates an example of an equivalent circuit for the second transistor switch SW2. A switched or controlled channel in switch SW2 is provided, for instance, between the drain connection D7 and the source connection S7. Control is provided by a control voltage at gate connection G7. In a similar manner to transistor switch SW1, pn transition regions PN5 and PN6 are formed between the drain connection D7 or the source connection S7 and the substrate connection that is coupled to the source potential connection VSS. Here again, the resultant depletion layer capacitances, whose value depends on the voltage is applied, will inevitably affect the integration process. Nevertheless, as in the case of transistor switch SW1, the variation in voltage is reduced by the transfer characteristic or amplification provided by the differential amplifier 30.

Figure 7:
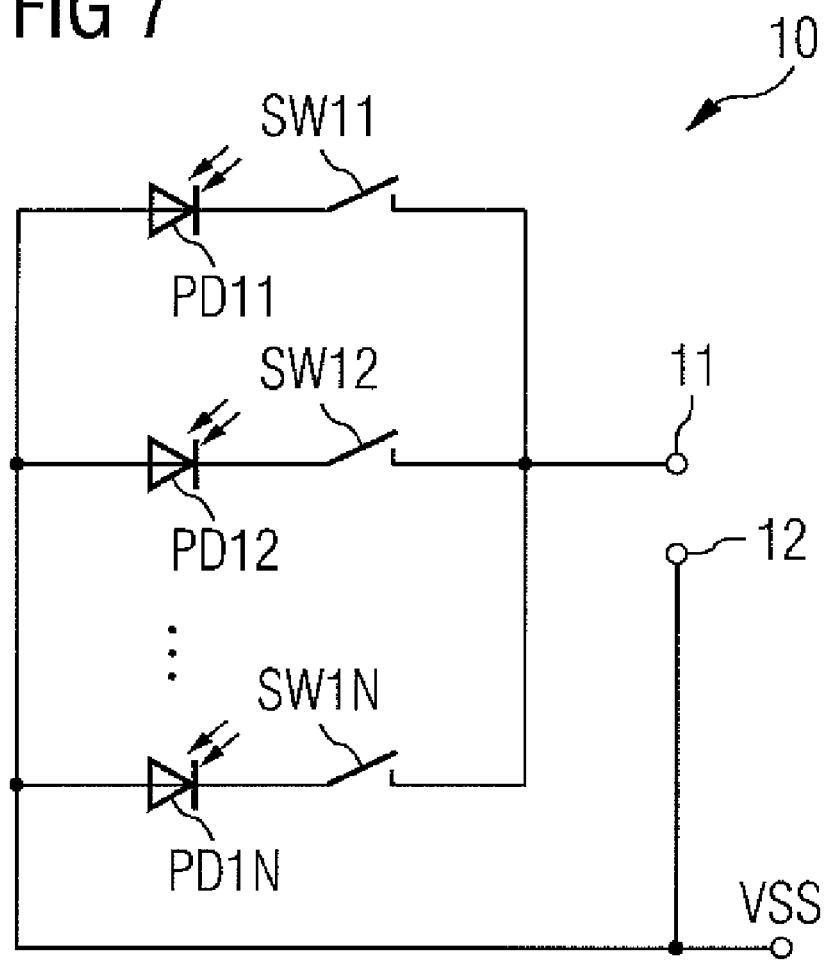

FIG. 7 shows an embodiment of a charge-generating circuit 10. The charge-generating circuit 10 has a number of photodiodes, PD11, PD12, PD1N, each of which is connected in series with an associated switch SW11, SW12, SW1N. The anode connections of the photodiodes PD11, PD12, PD1N, are coupled together and are connected to the source potential connection VSS and to connection 12. At the cathodes, the switches SW11, SW12, SW1N are coupled to connection 11.

The photodiodes PD11, PD12, PD1N, may, for instance, represent a physical row of photodiodes in the sensor field of a digital X-ray device. When the device is operating, the photodiodes PD11, PD12, PD1N, can, for example, be connected between connections 11 and 12 one after another through appropriate operation of the switches SW11, SW12, SW1N, in such a way that at any one time only one photodiode is generating a charge-dependent signal. A digital X-ray device may, for instance, make use of multiple arrangements in accordance with one of the described embodiments, each of which processes a line containing photodiodes in a two-dimensional sensor field.

Parasitic capacitances, represented, for instance, in FIGS. 2 and 3 by the parasitic capacitance CP, can occur as a result of the required connecting lines and the switches SW11, SW12 and SW1N. The coupling circuit 20, however, reduces the effect of the parasitic capacitances on the integration process.

As a result of the increased linearity of the arrangement for charge integration, it is suitable for the integration of both large and small charge magnitudes. Because small values can be chosen for the capacitative charge store C1, the time constant required for integration is reduced. This permits faster integration and therefore higher image rates to be obtained from a digital X-ray machine.

The noise of the differential amplifier, or of the entire arrangement, can be reduced by supplying a higher working-point or bias current. Because, however, the noise has a reduced effect on the charging of the parasitic capacitances, in particular in the charge generation circuit 10, the differential amplifier can be operated with lower current consumption. The arrangement is therefore characterized by a low power consumption.

An arrangement for charge integration according to one of the suggested embodiments can be used, for instance, in a digital X-ray machine. In other embodiments, the charge generation circuit 10 may also comprise other charge-generating elements, such as piezoelectric sensors. The arrangement can be manufactured in integrated form on a piece of semiconductor.

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An arrangement for charge integration, comprising:
a charge generating circuit configured to provide a charge-dependent signal;
a coupling circuit having a first and a second transistor, wherein the first transistor is adapted to be controlled in dependence on the charge-dependent signal, and the second transistor is configured to forward the charge-dependent signal depending on a control signal provided by the first transistor; and
an integrator configured to integrate the charge-dependent signal, which has been forwarded,
wherein the charge-dependent signal, which has been forwarded, is passed to the integrator through a switching unit configured to be controlled in accordance with a further control signal, and
wherein the charge-dependent signal is transmitted through the coupling circuit and the switching unit to the integrator to charge a capacitive charge store of the integrator.

2. The arrangement according to claim 1, wherein the integrator comprises a differential amplifier with feedback through the capacitive charge store.

3. The arrangement according to claim 2, wherein the capacitive charge store is discharged in dependence on another control signal.

4. The arrangement according to claim 1, wherein the charge generating circuit comprises at least one photodiode.

5. The arrangement according to claim 1, wherein the first and second transistors are field-effect transistors.

6. A method of charge integration, comprising:
generating a charge-dependent signal from a charge-generating circuit;
generating a control signal depending on the charge-dependent signal;
forwarding, through a coupling circuit, the charge-dependent signal in dependence on the control signal;
passing the charge-dependent signal, which has been forwarded, through a switching unit configured to be controlled in accordance with a further control signal; and
integrating the charge-dependent signal, which was passed through the switching unit, to create an output signal,
wherein the charge-dependent signal is transmitted through the coupling circuit and the switching unit to charge a capacitive charge store for the integration such that a charge output from the charge-generating circuit is integrated in the capacitive charge store.

7. The method according to claim 6, wherein the integration is carried out by a differential amplifier that has feedback provided through the capacitative charge store.

8. The method according to claim 7, wherein, during a first period of time, the charge store is discharged under the control of the further control signal, and wherein, during a second period of time, the charge-dependent signal is passed on in dependence on the further control signal.

9. A method of charge integration, comprising:
generating a charge-dependent signal;
generating a control signal depending on the charge-dependent signal;
forwarding, through a coupling circuit, the charge-dependent signal in dependence on the control signal;
passing the charge-dependent signal, which has been forwarded, through a switching unit configured to be controlled in accordance with a further control signal; and
integrating the charge-dependent signal, which was passed through the switching unit, to create an output signal,
wherein the charge-dependent signal is transmitted through the coupling circuit and the switching unit to charge a capacitive charge store for the integration,
wherein the coupling circuit comprises a first transistor and a second transistor, and
wherein the first transistor is controlled in accordance with the charge-dependent signal and the second transistor is configured to forward the charge-dependent signal based on a control signal generated by the first transistor.

10. The method according to claim 9, wherein the integration is carried out by a differential amplifier that has feedback provided through the capacitative charge store.

11. The method according to claim 10, wherein, during a first period of time, the charge store is discharged under the control of the further control signal, and wherein, during a second period of time, the charge-dependent signal is passed on in dependence on the further control signal.

* * * * *